Oct. 31, 1933.　　　　P. B. CAMP　　　1,933,094
AUTOMATIC SLACK ADJUSTER
Filed Feb. 9, 1931　　　3 Sheets-Sheet 1
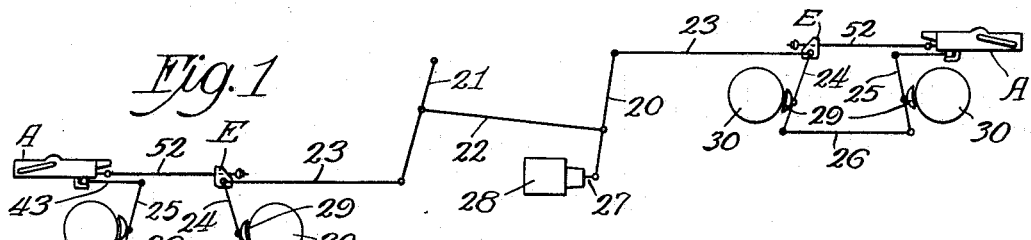
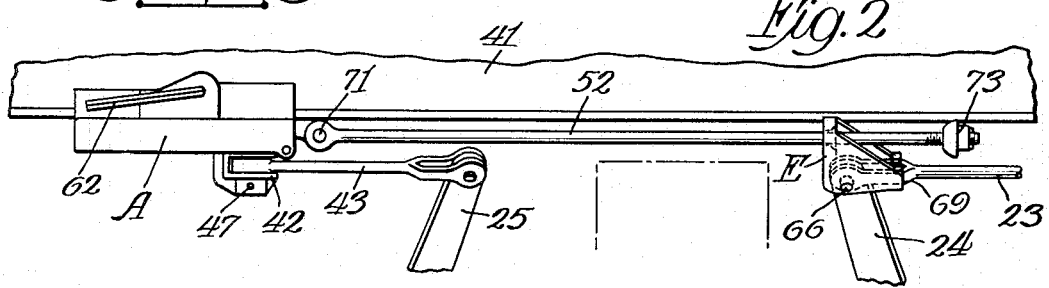
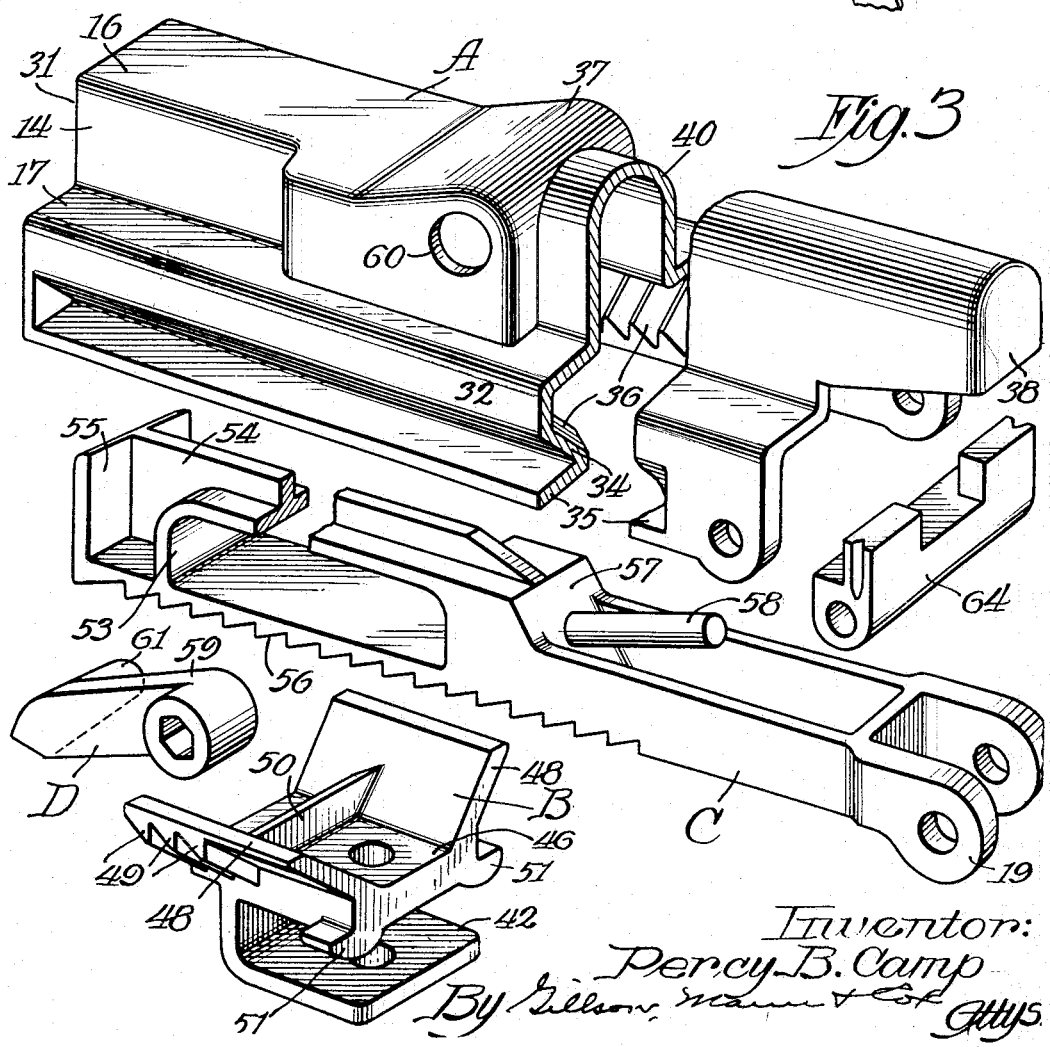
Inventor:
Percy B. Camp
By Gibson, ........ Attys Oct. 31, 1933.  P. B. CAMP  1,933,094
AUTOMATIC SLACK ADJUSTER
Filed Feb. 9, 1931  3 Sheets-Sheet 2
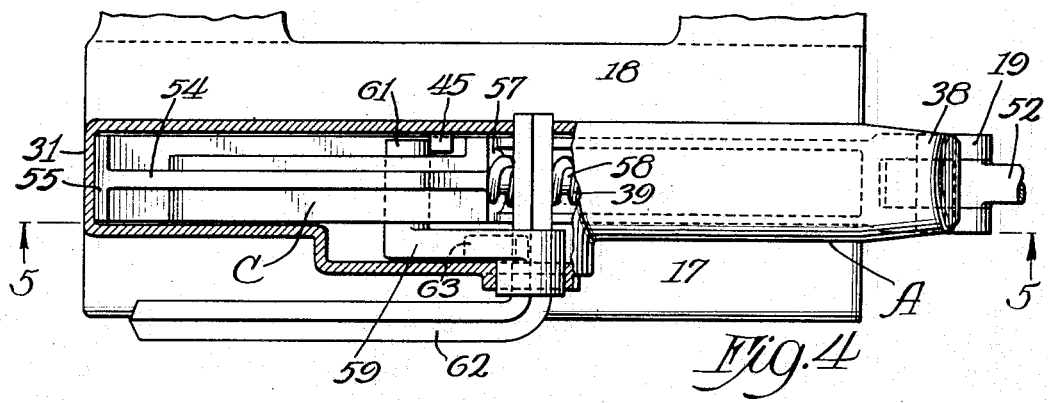
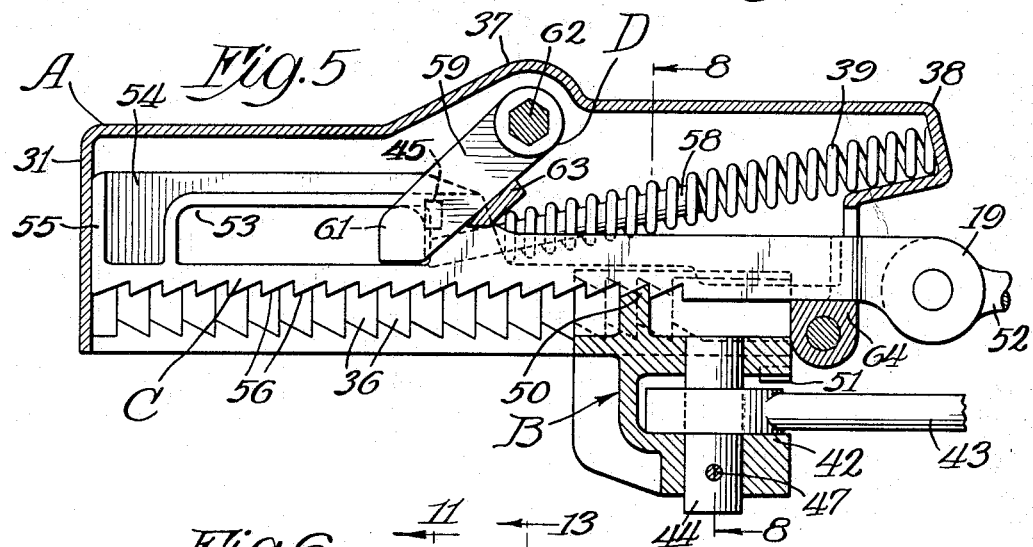
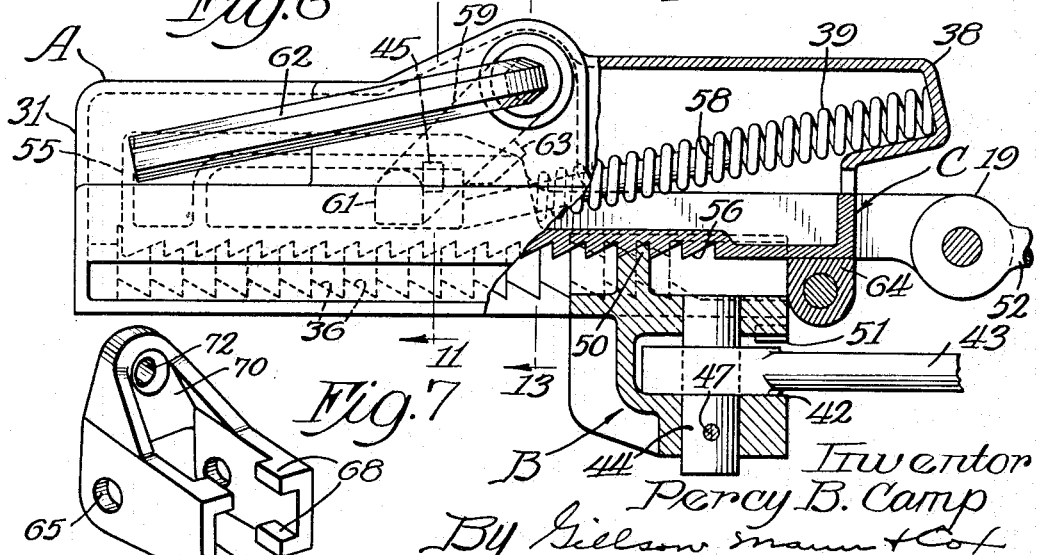
Inventor
Percy B. Camp

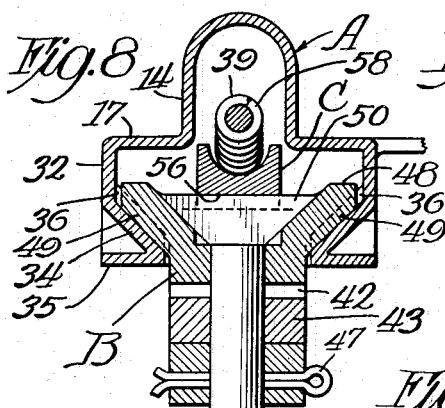
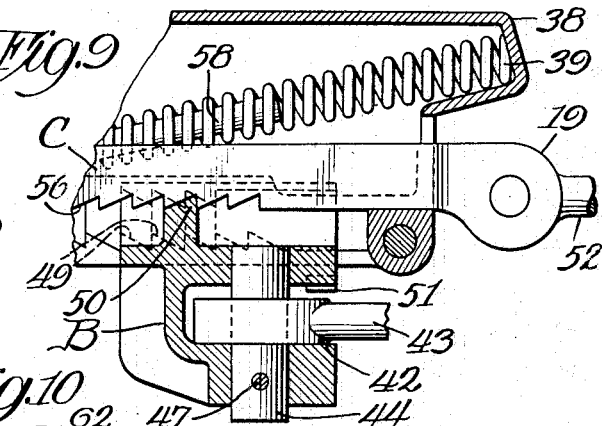
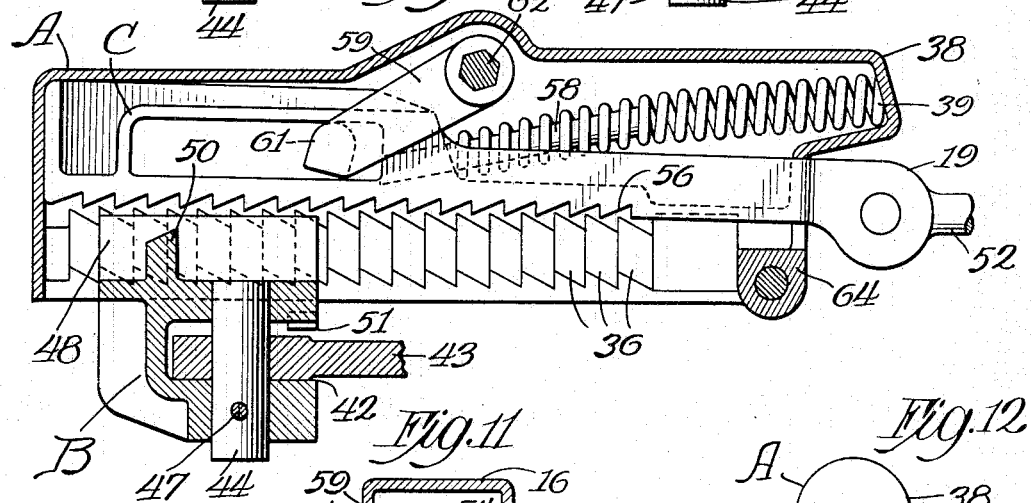
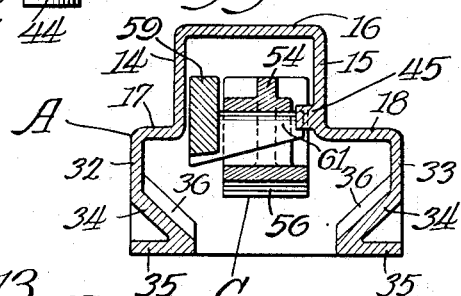
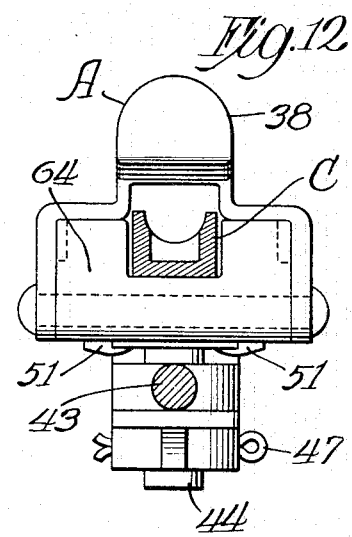
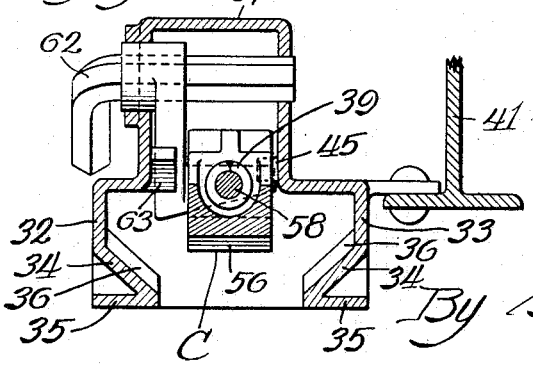

Patented Oct. 31, 1933

1,933,094

UNITED STATES PATENT OFFICE 1,933,094

AUTOMATIC SLACK ADJUSTER

Percy E. Camp, Maywood, Ill., assignor to Universal Draft Gear Attachment Co., a corporation of Illinois Application February 9, 1931. Serial No. 514,473

17 Claims. (Cl. 188—200)

This invention relates to an automatic slack adjuster for brake mechanism and has for its primary object to provide a device which will automatically eliminate the excess slack in the mechanism thereby causing the brakes to operate at maximum efficiency at all times. It is also an object of this invention to avoid a multiplicity of parts and to make the adjuster as fool-proof as possible.

Other and further objects and advantages will become apparent as the disclosure proceeds and the description is read in conjunction with the accompanying drawings, in which Fig. 1 is a diagrammatic view of conventional brake gear equipped with slack adjusters of this invention;

Fig. 2 is an elevational view of the adjuster and truck levers, the brakes being fully released;

Fig. 3 is a composite view of the adjuster showing the various parts in perspective;

Fig. 4 is a plan view of the adjuster with a portion broken away to expose the release mechanism;

Fig. 5 is a vertical, sectional view taken on the line 5—5 of Fig. 4 showing the normal position of the adjuster rack;

Fig. 6 is a side, elevational view with a portion broken away to illustrate the functioning of the adjuster rack as it is moved to the right by excess brake travel;

Fig. 7 is a perspective view of the live lever extension which actuates the adjuster rack when there is excess slack in the brake system;

Fig. 8 is a transverse, sectional view taken on the line 8—8 of Fig. 5;

Fig. 9 corresponds to the exposed portion of Fig. 6, showing the parts in the position they assume upon release of the brakes;

Fig. 10 illustrates the action of the release mechanism of the adjuster;

Fig. 11 is a sectional view taken on the line 11—11 of Fig. 6;

Fig. 12 is an end, elevational view of the adjuster; and

Fig. 13 is a sectional view taken on the line 13—13 of Fig. 6 and showing the manner in which the adjuster is secured to a car sill.

For the purpose of this disclosure, a particular form has been shown in the drawings and will here be described, but it is realized that the invention may be embodied in other forms as well, and, therefore, the appended claims are not to be limited by this specific disclosure except as required by the prior art.

The adjusters are ordinarily applied to each end of a car where they are secured to a car sill as shown in Figs. 1 and 2. They are automatically actuated whenever there is excess slack in the brake system.

The foundation brake gear shown in Fig. 1 is of conventional form and comprises a live cylinder lever 20 connected to the dead cylinder lever 21 by a rod 22, pull rods 23 which join the cylinder levers with the live truck levers 24, and dead truck levers 25 which have bottom connections 26 with the live truck levers. When the push rod 27 of the air brake cylinder 28 is moved to the right, the brake shoes 29 are pressed against the car wheels 30, thus applying the brakes.

The adjuster in its general organization comprises a casing A, a fulcrum block B, an adjuster rack C, a crank arm release D, and a live truck lever extension E.

The casing A comprises an elongated casting having a flat end wall 31, lower side walls 32 and 33, upper side walls 14 and 15, top wall 16, and intermediate top walls 17 and 18. The lower side walls are carried inwardly at 34 and then outwardly at 35 to form a seat for the wing-shaped fulcrum block.

Forwardly facing rack teeth 36 are integrally cast with the internal inclined walls 34, the wall 31 being considered the forward end of the adjuster for convenience. The rack teeth 36 extend the full length of the casing except for a small distance at the rear of the casing where the side walls 32 and 33 extend downwardly the full depth of the casing.

The top of the casing has an enlargement 37 to accommodate the release arm, and the rear end of the casing is provided with a protruding snout 38 which houses the take-up spring 39. Preferably the upper wall of this portion of the casing is rounded as at 40.

The adjuster may be secured to the car body in any suitable manner as for example by riveting the same to the bottom flange of a car sill 41, as shown in Fig. 13.

The fulcrum block B is intended to anchor the fulcrum of the dead truck lever at the points with respect to the car body which will give proper brake shoe clearance when the brakes are in release position. The block is provided with a jaw 42 receiving one end of a dead lever connection 43 which is held in place by a pin 44. Ordinarily the pin is driven in from the bottom and a cotter 47 passing through the lower jaw arm prevents accidental dislodgement.

The fulcrum block is provided with inclined wings 48 which have integrally cast rearwardly facing rack teeth 49 on one end of their lower side which cooperate with the rack teeth of the casing to anchor the fulcrum block against movement to the right.

A rearwardly facing rack tooth 50 bridges the channel 46 between the wings 48 and coacts with the adjuster rack to move the fulcrum block to the left when excess slack exists in the brake system.

There is a normal tendency for the rear end of the fulcrum block to rise upon application of the brakes since the stress acting through the connection 43 is not in alignment with the reacting stress between the casing and fulcrum block teeth. To counteract this tendency, and, in addition, to use it to advantage, laterally extending lugs 51 are provided on the block which engage the walls 35 of the casing so that as the brakes are applied, the forces acting on the block act as a lever to maintain the casing and fulcrum block teeth in engagement.

The adjuster rack C rides upon the fulcrum block and is held in constant engagement therewith by the inclined take-up spring 39. The rear end of the rack is channel-shaped as best shown in Fig. 12 and terminates in a jaw 19 which receives the take-up rod 52 that actuates the mechanism. The mid-section of the rack has an elongated slot 53, the upper and forward walls of which are reinforced by a rib 54 which joins with an upright end wall 55 at the forward end of the rack. The rack teeth 56 are cut into the lower face of the member and face forward.

The take up spring 39 abuts against an inclined face 57 and is guided by a stud 58 extending from the rack in the direction of the casing snout 38. For convenience of manufacture, this stud 58 is preferably made separate from the adjuster rack.

In adjusters of this type, it is necessary to provide manual means for releasing the fulcrum block so that new brake shoes may be substituted for those badly worn. In the present case, this is accomplished by a crank arm 59 pivoted at 60 in the casing and having a stud or lug 61 which rides in the slot 53. The crank arm is operated by a handle 62 extending outside of the casing and normally holding the crank arm down by its own weight. A lug 63 formed on the inner side wall of the casing enlargement 37 limits the downward movement of the crank arm and thus forms a support for the forward end of the adjuster rack. In addition, this lug prevents the take-up spring from dropping the forward end of the rack to such an extent that there is a possibility of the rack becoming disengaged with the fulcrum block.

To release the fulcrum block, the handle 62 is raised carrying with it the crank arm and adjuster rack, there being sufficient height to the casing to permit this function to take place.

After the various parts have been assembled within the casing, the spacer 64 is bolted in place thereby furnishing a bearing support for the rear end of the adjuster rack.

The live truck lever extension is cast or stamped in a single piece and is drilled at 65 to receive the pin 66. The extension has a pair of rearwardly extending arms 67 equipped with inwardly extending ears 68 which engage the pull rod jaw 69. Since the pull rods always are substantially horizontal during application of the brakes, the forward wall 70 of the lever extension will always be vertical.

It will be understood that the particular shape of the lever extension is necessarily determined by the arrangement of the brake gear, and that in hopper cars, for example, where the conventional foundation brake gear is modified to suit the space available, it may be necessary to adapt the extension to the environment in which it is used. In all cases, however, to insure proper action of the adjuster, means should be provided on the extension to coact with a brake member moving substantially in a single plane so that the guide will always be at right angles to the actuating rod 52.

The take-up rod is pivotally connected at 71 to the adjuster rack, the other end passing through an aperture 72 in the wall 70 of the lever extension and carrying an adjustable stop 73 screwed on to the end of the rod. The stop is so adjusted that during normal operation of the brakes, the extension E will not strike the stop 73 to actuate the adjuster. However, when there is excess slack in the brake system, the wall 70 of the extension will engage the stop 73 pulling the take-up rod 52 to the right to make an adjustment of the dead lever fulcrum.

Referring to Fig. 5, the parts of the adjuster are shown in their normal position with the adjuster rack at its extreme forward position which is limited by the end wall 55 striking the wall 31 of the casing. When sufficient slack has developed in the brake system to cause the adjuster rack to move to the right a distance of one tooth or more, as shown in Fig. 6, the fulcrum block "B" will remain stationary but will be found engaging a different tooth on the adjuster rack. At the same time, the take-up spring 39 is compressed and upon release of the brakes, the spring will force the adjuster rack back to its normal position carrying with it the fulcrum block which clatters over the casing teeth to be anchored in its new position. The new position of the fulcrum block is shown in Fig. 9.

It will be noticed that the fulcrum block is anchored against movement to the right so that upon brake application, the dead lever fulcrum will be fixed. In addition, the casing fulcrum block teeth prevent the fulcrum block from being moved to the right when the adjuster rack is actuated by excess brake travel.

To release the adjuster for the insertion of new brake shoes, it is only necessary to lift the release handle 62 whereupon the fulcrum block may be raised from the casing teeth and moved back to the right.

A safety feature is incorporated into the adjuster to protect the device against injury or destruction when something happens to cause an abnormal take-up action of the rod 52, as for example, when a brake shoe is lost. To this end, a lug 45 is provided on the internal casing wall opposite the lug 63 which engages the stud 61 extending from the slot, and thereby forms a rigid beam in the path of the adjuster rack when the take up rod 52 is moved a distance greater than the length of the slot 53. It will be seen that as the adjuster rack is moved to the right an abnormal distance, the forward wall of the slot will strike the stud 61 and arrest the rack, the stud being held immovable by the lugs 45 and 63 on the casing. In this way, the parts are protected, and brake application is assured.

What I claim, therefore, is:

1. In a brake mechanism including a dead and a live brake lever, the combination of a fixed casing having internal forwardly facing rack teeth, an adjuster rack within the casing slidably connected with the live lever and movable upon excess brake travel, a fulcrum block pivoted to the fulcrum of the dead lever, rearwardly facing rack teeth on the block cooperating with the casing teeth to hold the dead lever fulcrum immovable during brake application, a rearwardly facing tooth on the block engaging the adjuster rack, and spring means operating to return the adjuster to its normal position and the fulcrum block to its adjusted position after the excess brake travel has occurred.

2. In a brake mechanism including a dead and a live brake lever, the combination of a fixed casing having internal forwardly facing rack teeth, an adjuster rack within the casing slidably connected with the live lever and movable upon excess brake travel, a fulcrum block pivoted to the fulcrum of the dead lever, rearwardly facing rack teeth on the block cooperating with the casing teeth to hold the dead lever fulcrum immovable during brake application, a rearwardly facing tooth on the block engaging the adjuster rack, and an inclined spring urging the rack teeth of the adjuster into engagement with the fulcrum block tooth, and moving the adjuster to its normal position and the fulcrum block to its adjusted position after excess brake travel has occurred.

3. In an automatic brake adjusting device, a fixed casing provided with internal rack teeth, a fulcrum block supporting the fulcrum of a brake lever and adjustable along the casing, an adjuster shiftable with relation to the fulcrum block upon excess brake travel, and spring means for restoring the adjuster to normal position and moving the fulcrum block to adjusted position after excess brake travel has actuated the adjuster.

4. In an automatic brake adjusting device, a fixed casing provided with internal rack teeth, a fulcrum block supporting the fulcrum of a brake lever and having rack teeth cooperating with the casing teeth to oppose relative movement in one direction, an adjuster shiftable with relation to the fulcrum block upon excess brake travel, means for restoring the adjuster to normal position, and means on the adjuster engaging the fulcrum block to adjust the latter upon the restoring movement of the adjuster.

5. In a brake mechanism including a live and a dead lever, the combination of a fixed casing provided with rack teeth, an adjuster rack actuated from the live lever upon excess brake travel, a fulcrum block intermediate the casing and the adjuster carrying the dead lever fulcrum and having rack teeth to cooperate with the casing and the adjuster teeth, and spring means restoring the adjuster to normal position upon release of the brakes and simultaneously shifting the fulcrum block to its adjusted position.

6. In a brake mechanism including a live and a dead lever, the combination of a fixed casing provided with rack teeth, an adjuster rack actuated from the live lever upon excess brake travel, a fulcrum block intermediate the casing and the adjuster carrying the dead lever fulcrum and having rack teeth to cooperate with the casing and the adjuster teeth, and spring means restoring the adjuster to normal position upon release of the brakes and simultaneously shifting the fulcrum block to its adjusted position, said spring means being inclined from the adjuster to yieldingly hold the latter in engagement with the fulcrum block.

7. In an automatic brake adjusting device, a fixed casing provided with internal rack teeth, a fulcrum block supporting the fulcrum of a brake lever and having rack teeth cooperating with the casing teeth to oppose relative movement in one direction, an adjuster shiftable with relation to the fulcrum block upon excess brake travel, means for restoring the adjuster to normal position, and means on the adjuster engaging the fulcrum block to adjust the latter upon the restoring movement of the adjuster, and a manual release for the device.

8. In a brake mechanism including a live and a dead lever, the combination of a fixed casing provided with rack teeth, an adjuster rack actuated from the live lever upon excess brake travel, a fulcrum block intermediate the casing and the adjuster carrying the dead lever fulcrum and having rack teeth to cooperate with the casing and the adjuster teeth, spring means restoring the adjuster to normal position upon release of the brakes and simultaneously shifting the fulcrum block to its adjusted position, and means for releasing the adjuster rack from the fulcrum block including an arm engaging a slot in the adjuster.

9. In an automatic brake adjusting device, a fixed casing provided with internal rack teeth, a fulcrum block carrying the fulcrum of a brake lever and having teeth cooperating with the casing teeth to oppose relative movement in one direction, an adjuster rack adapted to automatically shift its position relative to the fulcrum block a distance equal to excess brake travel, an inclined spring holding the adjuster rack in engagement with the fulcrum block and moving the adjuster to normal position and the fulcrum block to adjusted position upon release of the brakes, and means for supporting the free end of the adjuster rack.

10. In an automatic brake adjusting device, a casing, a fulcrum block carrying the fulcrum of a brake lever, a slotted adjuster rack movable relative to the fulcrum block upon excess brake travel, means for restoring the adjuster to its normal position and simultaneously moving the fulcrum to its adjusted position upon the release of the brakes, means on the casing for holding the fulcrum block in adjusted position, and release mechanism including a crank arm provided with a lug engageable with the adjuster slot to raise the adjuster from the fulcrum block.

11. In an automatic brake adjusting device, a casing, a fulcrum block carrying the fulcrum of a brake lever, a slotted adjuster rack movable relative to the fulcrum block upon excess brake travel, means for restoring the adjuster to its normal position and simultaneously moving the fulcrum to its adjusted position upon the release of the brakes, means on the casing for holding the fulcrum block in adjusted position, relaese mechanism including a crank arm provided with a lug engageable with the adjuster slot to raise the adjuster from the fulcrum block, and a stop limiting the release position of the crank arm and thereby forming a support for the free end of the adjuster rack.

12. In an automatic brake adjusting device, a fixed casing provided with integral rack teeth, a fulcrum block carrying the fulcrum of a brake lever and having teeth cooperating with the casing teeth to oppose relative movement in one direction, an adjuster shiftable relative to the fulcrum block upon excess brake travel, means on the fulcrum block to encourage anchorage during brake application, and means to return the parts to normal position after an adjustment has been made.

13. In an automatic brake adjusting device, a support fixed to the underframe of a car body, two members freely movable with respect to each other in one direction and operatively connected one to a live lever and the other to a dead lever of the brake gear, and an inclined spring urging the two members into constant engagement regardless of the position of the brake gear and adapted to restore the live lever connection to normal position and the dead lever connection to adjusted position after excess slack has occurred.

14. In a brake adjusting mechanism, a support secured to the underframe of a bar body, two members within the casing freely movable with respect to each other in one direction, one of the members being operatively connected to a live lever of the brake mechanism and actuated only upon excess brake travel, the other being connected to a dead lever, and an inclined spring urging the two members into constant engagement regardless of the position of the brake gear and furnishing the energy to restore the parts to proper position after the mechanism has been actuated.

15. A live lever extension for guiding the actuating rod of a brake adjuster comprising a member having means thereon adapted to maintain the member in its desired position relative to the actuating rod.

16. In an automatic brake adjusting device, a support, two members freely movable with respect to each other in one direction and operatively connected one to a live lever and the other to a dead lever of the brake gear, a spring adapted to restore the live lever connection to normal position and the dead lever connection to adjusted position after excess slack has occurred, and safety means comprising a beam operatively interposed in the path of the live lever connection to prevent excessive travel.

17. In an automatic brake adjusting device, a casing, a fulcrum block carrying the fulcrum of a brake lever, a slotted adjuster rack movable relative to the fulcrum block upon excess brake travel, means for restoring the adjuster to its normal position and simultaneously moving the fulcrum to its adjusted position upon the release of the brakes, means on the casing for holding the fulcrum block in adjusted position, release mechanism including a crank arm provided with a stud slidable within the adjuster slot and adapted to raise the adjuster from the fulcrum block, and means for supporting the free end of the stud upon abnormal travel of the adjuster.

PERCY B. CAMP.